(12) United States Patent
Tsukada et al.

(10) Patent No.: US 8,373,869 B2
(45) Date of Patent: Feb. 12, 2013

(54) CHARGING SYSTEM, CHARGING METHOD, RECORDING MEDIUM, AND IMAGE FORMING APPARATUS FOR PERFORMING CHARGING PROCESS WITH IMPROVED USER CONVENIENCE

(75) Inventors: Koji Tsukada, Sagamihara (JP); Hiroyasu Ito, Okazaki (JP); Harumitsu Fujimori, Machida (JP); Ichiro Bessho, Okazaki (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 746 days.

(21) Appl. No.: 12/557,663

(22) Filed: Sep. 11, 2009

(65) Prior Publication Data
US 2010/0067046 A1   Mar. 18, 2010

(30) Foreign Application Priority Data
Sep. 12, 2008   (JP) ................. 2008-235166

(51) Int. Cl.
  *G06F 3/12* (2006.01)
  *G07F 19/00* (2006.01)
(52) U.S. Cl. ............ 358/1.13; 358/1.14; 358/1.15; 358/1.16; 399/75; 399/77; 399/79; 399/80; 399/23; 705/30; 705/7.35; 705/34
(58) Field of Classification Search ........ 358/1.13–1.18; 399/75, 77, 79, 80–85, 24, 23, 8, 10, 11; 705/30, 7.35, 34
See application file for complete search history.

(56) References Cited

U.S. PATENT DOCUMENTS

| | | | | |
|---|---|---|---|---|
| 6,216,113 B1 * | 4/2001 | Aikens et al. | ................. | 705/34 |
| 8,156,020 B2 * | 4/2012 | Murayama et al. | ............. | 705/34 |
| 2001/0053295 A1 * | 12/2001 | Kujirai et al. | ................. | 399/79 |
| 2002/0001099 A1 * | 1/2002 | Okuda et al. | ................. | 358/1.15 |
| 2004/0070793 A1 * | 4/2004 | Lech et al. | ................. | 358/403 |

(Continued)

FOREIGN PATENT DOCUMENTS

| | | |
|---|---|---|
| JP | 11-098291 A | 4/1999 |
| JP | 2001-309102 A | 11/2001 |

(Continued)

OTHER PUBLICATIONS

Office Action from Japanese Patent Office issued in Applicant's corresponding Japanese Patent Application No. 2008-235166 dated Sep. 7, 2010, and English Translation thereof.

*Primary Examiner* — Twyler Haskins
*Assistant Examiner* — Dennis Dicker
(74) *Attorney, Agent, or Firm* — Buchanan Ingersoll & Rooney PC

(57) ABSTRACT

A charging management server is informed of an ID number stored in an IC card, and a user charging table of the charging management server is read. A new user charging list is transmitted to an MFP. In the case where the MFP receives a cooperative job to be executed by a cooperative server, a sub charging list is generated. The generated new sub charging list is transmitted together with image data to the cooperative server. The cooperative server executes the job on the basis of charging a fee for the job. As the job is executed on the basis of charging, the sub charging list is updated. In parallel with the execution of the cooperative job by the cooperative server, the MFP can perform a normal job according to the charging list.

16 Claims, 15 Drawing Sheets

U.S. PATENT DOCUMENTS

| | | |
|---|---|---|
| 2004/0184107 A1 | 9/2004 | Iino et al. |
| 2004/0223778 A1* | 11/2004 | Zwiefelhofer .................. 399/79 |
| 2005/0129423 A1* | 6/2005 | Lester et al. ..................... 399/79 |
| 2006/0044590 A1* | 3/2006 | Ferlitsch et al. ............. 358/1.14 |
| 2007/0070389 A1 | 3/2007 | Hidaka |
| 2009/0086255 A1* | 4/2009 | Duong ......................... 358/1.15 |

FOREIGN PATENT DOCUMENTS

| | | |
|---|---|---|
| JP | 2002-117157 A | 4/2002 |
| JP | 3485195 B2 | 1/2004 |
| JP | 2004-287662 A | 10/2004 |
| JP | 2004-341747 A | 12/2004 |
| JP | 2005-024817 A | 1/2005 |
| JP | 2005-128880 A | 5/2005 |
| JP | 2005-174172 A | 6/2005 |
| JP | 2006-092304 A | 4/2006 |
| JP | 4017565 B2 | 12/2007 |
| JP | 4023600 B2 | 12/2007 |
| JP | 2008-021233 A | 1/2008 |
| JP | 4047451 B2 | 2/2008 |
| JP | 2008-097549 A | 4/2008 |
| JP | 2008-117335 A | 5/2008 |
| JP | 4102631 B2 | 6/2008 |
| JP | 2008-176704 A | 7/2008 |

* cited by examiner

| ID NUMBER | EXCLUSIVE CONTROL |
|---|---|
| 00000 | 0 |
| 00001 | 0 |
| 00100 | 0 |
| 01001 | 1 |
| ⋮ | ⋮ |

| ID NUMBER | COUNTER | COUNTER UPPER LIMIT | UNIT PRICE ||||||||
|---|---|---|---|---|---|---|---|---|---|
| | | | COPY A4 | COPY A3 | PRINT A4 | PRINT A3 | DECRYPTION 1 PAGE | OCR 100 CHARACTERS | ENGLISH-JAPANESE TRANSLATION 100 CHARACTERS | JAPANESE-ENGLISH TRANSLATION 1000 CHARACTERS |
| 00001 | 88 | 4000 | 1 | 2 | 1 | 2 | 1 | 1 | 1 | 1 |
| 00032 | 1005 | 10000 | 1 | 2 | 1 | 2 | 0 | 1 | 1 | 1 |
| 00100 | 1145 | 1200 | 1 | 2 | 1 | 2 | 1 | 1 | 2 | 2 |
| 01001 | 0 | 100 | 1 | ... | ... | ... | ... | 2 | 2 | 2 |
| ... | ... | ... | ... | ... | ... | ... | ... | ... | ... | ... |

| ID NUMBER | 00001 |
|---|---|
| COUNTER | 88 |
| COUNTER UPPER LIMIT | 4000 |
| COPY/A4 | 1 |
| COPY/A3 | 2 |
| PRINT/A4 | 1 |
| PRINT/A3 | 2 |
| DECRYPTION/1 PAGE | 1 |
| OCR/100 CHARACTERS | 1 |
| ENGLISH-JAPANESE TRANSLATION/100 CHARACTERS | 1 |
| JAPANESE-ENGLISH TRANSLATION/1000 CHARACTERS | 1 |

CHARGING LIST 27

| ID NUMBER | 00001 |
|---|---|
| COUNTER | 88 |
| COUNTER UPPER LIMIT | 4000 |
| COPY/A4 | 1 |
| COPY/A3 | 2 |
| PRINT/A4 | 1 |
| PRINT/A3 | 2 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/ 1000 CHARACTERS | 1 |

BEFORE CREATED

SUB CHARGING LIST 28

| ID NUMBER | 00001 |
|---|---|
| COUNTER | 0 |
| COUNTER UPPER LIMIT | 1956 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/ 1000 CHARACTERS | 1 |

CHARGING LIST 29

| ID NUMBER | 00001 |
|---|---|
| COUNTER | 2044 |
| COUNTER UPPER LIMIT | 4000 |
| COPY/A4 | 1 |
| COPY/A3 | 2 |
| PRINT/A4 | 1 |
| PRINT/A3 | 2 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/ 1000 CHARACTERS | 1 |

AFTER CREATED

FIG.16

SUB CHARGING LIST — 28

| ID NUMBER | 00001 |
|---|---|
| COUNTER | 10 |
| COUNTER UPPER LIMIT | 1956 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/1000 CHARACTERS | 1 |

CHARGING LIST — 29

| ID NUMBER | 00001 |
|---|---|
| COUNTER | 2064 |
| COUNTER UPPER LIMIT | 4000 |
| COPY/A4 | 1 |
| COPY/A3 | 2 |
| PRINT/A4 | 1 |
| PRINT/A3 | 2 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/1000 CHARACTERS | 1 |

BEFORE COMBINED

CHARGING LIST — 30

| ID NUMBER | 00001 |
|---|---|
| COUNTER | 118 |
| COUNTER UPPER LIMIT | 4000 |
| COPY/A4 | 1 |
| COPY/A3 | 2 |
| PRINT/A4 | 1 |
| PRINT/A3 | 2 |
| DECRYPTION/1 PAGE | 1 |
| OCR/100 CHARACTERS | 1 |
| ENGLISH-JAPANESE TRANSLATION/ 100 CHARACTERS | 1 |
| JAPANESE-ENGLISH TRANSLATION/1000 CHARACTERS | 1 |

AFTER COMBINED

FIG.17

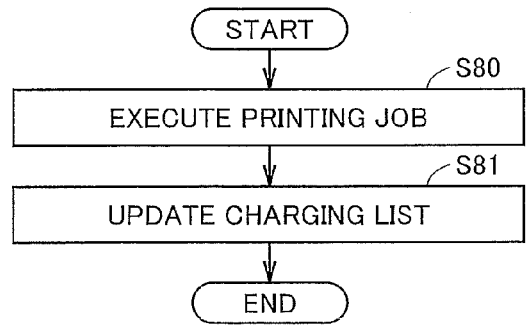

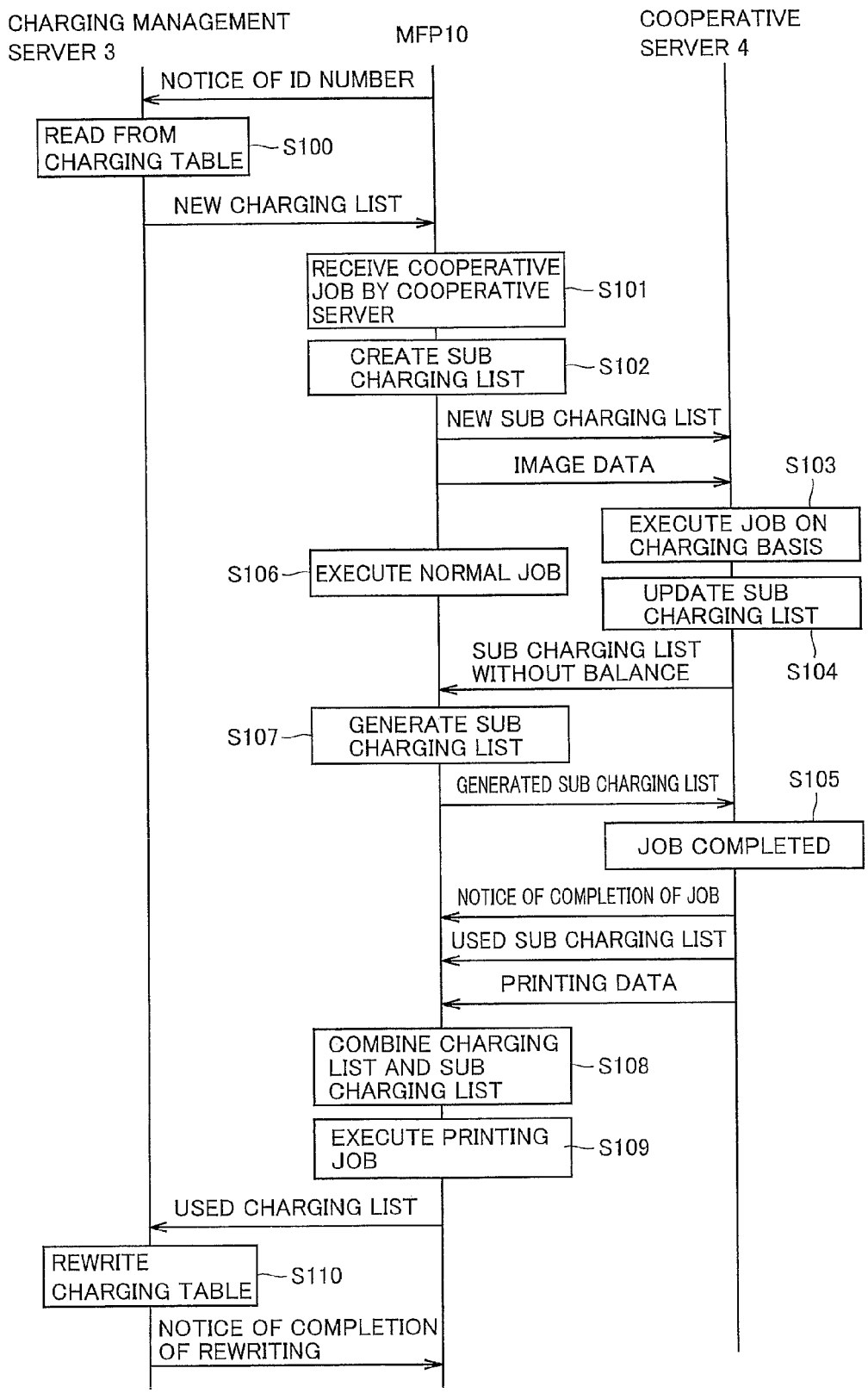

CHARGING SYSTEM, CHARGING METHOD, RECORDING MEDIUM, AND IMAGE FORMING APPARATUS FOR PERFORMING CHARGING PROCESS WITH IMPROVED USER CONVENIENCE

This application is based on Japanese Patent Application No. 2008-235166 filed with the Japan Patent Office on Sep. 12, 2008, the entire content of which is hereby incorporated by reference.

BACKGROUND OF THE INVENTION

1. Field of the Invention

The present invention relates to a charging process for charging a fee for use of each of an image forming apparatus and an external server that are connected to each other via a network to perform job processes in cooperation with each other.

2. Description of the Related Art

A method has been known for unifying the management of items such as the number of copies made by an image forming apparatus, using a management server connected to the image forming apparatus via a network, as disclosed for example in Japanese Laid-Open Patent Publication No. 2008-021233.

A charging system has also been known that provides a charging management server following a similar method to the above-described one for charging a user based on, for example, the number of copies made by an image forming apparatus or the like, as disclosed for example in Japanese Laid-Open Patent Publication No. 2002-117157. Regarding the management of charging, various methods have been proposed.

For example, Japanese Laid-Open Patent Publication No. 2005-024817 proposes, regarding the management of charging, a charging system using a charging management server for charging based on the resultant product or outcome.

In these years, an MFP (Multi Function Peripheral) that is a kind of image forming apparatus has increasingly sophisticated functions, and users are expecting an increasing number of functions to be implemented by the MFP.

For example, functions such as OCR (Optical Character Reader) and translation between English and Japanese, which have been considered difficult to implement, are expected to be carried out.

While the MFP has increasingly sophisticated functions, these functions impose a heavy load on processing. Thus, a method has been proposed according to which the MFP is configured to specialize in the overall control and usual functions such as printing, while an external server cooperating with the MFP is used to achieve the extended functions.

The MFP has a USB memory print function that enables a document file in a USB memory to be directly printed.

For the sake of security, data in a USB memory is encrypted in general, and the U3 standard of SanDisk® Corporation is a common encryption standard. The U3 standard employs a method according to which a data structure in a USB memory is divided into an application area and a data area, and an encryption application stored in the application area is used to encrypt or decrypt data in the data area.

Thus, in the case where the MPP performs the USB memory print function for a USB memory including encrypted data, the encryption application, which is often configured to operate on only an operating system (OS) of a personal computer (PC), cannot be executed directly on the MFP.

Therefore, in the case where the USB memory print function is performed for a USB memory including encrypted data, the MFP may handle the function of reading data from the USB memory and the function of printing a document file in the USB memory, while an external server connected via a network, for example, may handle the function of decrypting the encrypted data in the USB memory. In this way, the MFP and the external server can cooperate with each other to execute the USB memory print function.

In the case where the external server is used so that the external server and the MFP cooperate with each other to perform processes, namely the external server is used to perform extended functions such as decryption, OCR and translation between English and Japanese, the process performed by the external server is not an independent job process. A problem arises here as follows. Specifically, the management of charging is performed between the MFP and the charging management server. Therefore, while a cooperative process using the external server is performed, until a charging process based on the cooperative process using the external server is completed between the MFP and the charging management server, another job process such as copying that is completed by the MFP only without requiring the external server cannot be executed.

Further, if a fee is charged on the basis of a resultant product or outcome of a process such as decryption, OCR or translation between English and Japanese to be performed by the external server, a problem is that the fee for use could exceed an available amount because the fee for use cannot be predicted, and accordingly the job process could be ended without completed.

SUMMARY OF THE INVENTION

The present invention has been made to solve the problems above, and an object of the invention is to provide a charging system, a charging method, a recording medium and an image performing apparatus with which a charging process with improved user convenience is performed for a cooperative process using an external server.

A charging system according to the present invention includes an image forming apparatus having a charging list table necessary for a charging process, and an external server connected with the image forming apparatus via a network for executing a job process in cooperation with the image forming apparatus. The image forming apparatus includes: a first controller for executing a job process while executing a charging process job by job within a range of a balance included in the charging list table; and a first data transmission and reception device for transmitting and receiving data to and from the external server. The first controller determines whether an instruction to execute a job process that the external server is to be requested to execute is given, generates, when the instruction to execute is given, a charging list sub table associated with the external server within the range of the balance in the charging list table, updates the balance in the charging list table according to the generation of the charging list sub table, and transmits the generated charging list sub table together with the job process that the external server is to be requested to execute, to the external server via the first data transmission and reception device. The external server includes: a second data transmission and reception device for transmitting and receiving data to and from the image forming apparatus; and a second controller for executing the job process that the external server is requested to execute, independently of the first controller within a range of a balance included in the charging list sub table received by the second data transmission and reception device.

Preferably, the charging list table includes a fee for use, an advance payment and charging information according to a job process.

Preferably, the charging list sub table includes charging information according to a job process specific to the external server.

Preferably, the second controller of the external server updates the charging list sub table job by job for the job process that the external server is requested to execute, determines whether the job process that the external server is requested to execute is completed, and transmits, when it is determined that the job process that the external server is requested to execute is completed, the updated charging list sub table to the image forming apparatus via the second data transmission and reception device. The first controller of the image forming apparatus combines the updated charging list sub table received via the first data transmission and reception device with the charging list table.

Preferably, the second controller of the external server updates the charging list sub table job by job for the job process that the external server is requested to execute, determines whether a balance included in the updated charging list sub table has been spent while the job process that the external server is requested to execute is being executed, and transmits, when it is determined that the balance in the updated charging list sub table has been spent, the updated charging list sub table to the image forming apparatus via the second data transmission and reception device. The first controller of the image forming apparatus generates another charging list sub table associated with the external server within the range of the balance in the charging list table, based on the updated charging list sub table received via the first data transmission and reception device, and transmits the generated another charging list sub table to the external server via the first data transmission and reception device.

A charging method according to the present invention is a charging method for a charging system including an image forming apparatus having a charging list table necessary for a charging process, and an external server connected with the image forming apparatus via a network for executing a job process in cooperation with the image forming apparatus. The charging method includes the steps of: receiving input of an instruction to execute a job process that the external server is to be requested to execute; generating, when the input of the instruction to execute the job process that the external server is to be requested to execute is received, a charging list sub table associated with the external server within a range of a balance in the charging list table; updating the charging list table according to the generation of the charging list sub table; transmitting, to the external server, the generated charging list sub table together with the job process that the external server is to be requested to execute; and executing the job process that the external server is requested to execute, independently of the image forming apparatus, within a range of a balance included in the charging list sub table as received.

Preferably, the charging list table-includes a fee for use, an advance payment and charging information according to a job process.

Preferably, the charging list sub table includes charging information according to a job process specific to the external server.

Preferably, the method further includes the steps of: updating the charging list sub table job by job for the job process that the external server is requested to execute; determining whether the job process that the external server is requested to execute is completed; transmitting, when it is determined that the job process that the external server is requested to execute is completed, the updated charging list sub table from the external server to the image forming apparatus; and combining the updated charging list sub table transmitted from the external server with the charging list table.

Preferably, the method further includes the steps of: updating the charging list sub table job by job for the job process that the external server is requested to execute; determining whether a balance included in the updated charging list sub table has been spent while the job process that the external server is requested to execute is being executed; transmitting, when it is determined that the balance in the updated charging list sub table has been spent, the updated charging list sub table from the external server to the image forming apparatus; generating another charging list sub table associated with the external server within the range of the balance in the charging list table, based on the updated charging list sub table transmitted from the external server; and transmitting the generated another charging list sub table from the image forming apparatus to the external server.

A recording medium according to the present invention is a recording medium having a charging program recorded to be executed by a computer included in a charging system including: an image forming apparatus having a charging list table necessary for a charging process; and an external server connected with the image forming apparatus via a network for executing a job process in cooperation with the image forming apparatus. The charging program causes the computer to execute a process including the steps of: receiving input of an instruction to execute a job process that the external server is to be requested to execute; generating, when the input of the instruction to execute the job process that the external server is to be requested to execute is received, a charging list sub table associated with the external server within a range of a balance in the charging list table; updating the charging list table according to the generation of the charging list sub table; transmitting, to the external server, the generated charging list sub table together with the job process that the external server is to be requested to execute; and executing the job process that the external server is requested to execute, independently of the image forming apparatus, within a range of a balance included in the charging list sub table as received.

Preferably, the charging list table includes a fee for use, an advance payment and charging information according to a job process.

Preferably, the charging list sub table includes charging information according to a job process specific to the external server.

Preferably, the charging program causes the computer to execute the process further including the steps of: updating the charging list sub table job by job for the job process that the external server is requested to execute; determining whether the job process that the external server is requested to execute is completed; transmitting, when it is determined that the job process that the external server is requested to execute is completed, the updated charging list sub table from the external server to the image forming apparatus; and combining the updated charging list sub table transmitted from the external server with the charging list table.

Preferably, the charging program causes the computer to execute the process further including the steps of: updating the charging list sub table job by job for the job process that the external server is requested to execute; determining whether a balance included in the updated charging list sub table has been spent while the job process that the external server is requested to execute is being executed; transmitting, when it is determined that the balance in the updated charging list sub table has been spent, the updated charging list sub table from the external server to the image forming apparatus; generating another charging list sub table associated with the external server within the range of the balance in the charging list table, based on the updated charging list sub table transmitted from the external server; and transmitting the generated another charging list sub table from the image forming apparatus to the external server.

An image forming apparatus according to the present invention has a charging list table necessary for a charging process and is connected via a network with an external server executing a job process in cooperation with the image forming apparatus.

The image forming apparatus includes: a controller for executing a job process while executing a charging process job by job within a range of a balance included in the charging list table; and a data transmission and reception device for transmitting and receiving data to and from the external server. The controller determines whether an instruction to execute a job process that the external server is to be requested to execute is given, generates, when the instruction to execute is given, a charging list sub table associated with the external server within the range of the balance in the charging list table, updates the balance in the charging list table according to the generation of the charging list sub table, transmits the generated charging list sub table together with the job process that the external server is to be requested to execute, to the external server via the data transmission and reception device, receives, when the job process that the external server is requested to execute is completed, the charging list sub table updated job by job via the data transmission and reception device, and combines the updated charging list sub table received via the data transmission and reception device with the charging list table.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 3 illustrates the contents of an exclusive control table according to an embodiment of the present invention.

FIG. 4 illustrates the contents of a user charging table according to an embodiment of the present invention.

FIG. 12 schematically illustrates a procedure for creating a sub charging list according to an embodiment of the present invention.

FIG. 16 schematically illustrates a procedure for combining a sub charging list and a charging list according to an embodiment of the present invention.

FIG. 17 is a flow diagram illustrating execution of a printing job according to an embodiment of the present invention.

FIG. 21 is a sequence diagram illustrating a flow of control for the whole charging system of the present invention.

DESCRIPTION OF THE PREFERRED EMBODIMENTS

Figure 1:
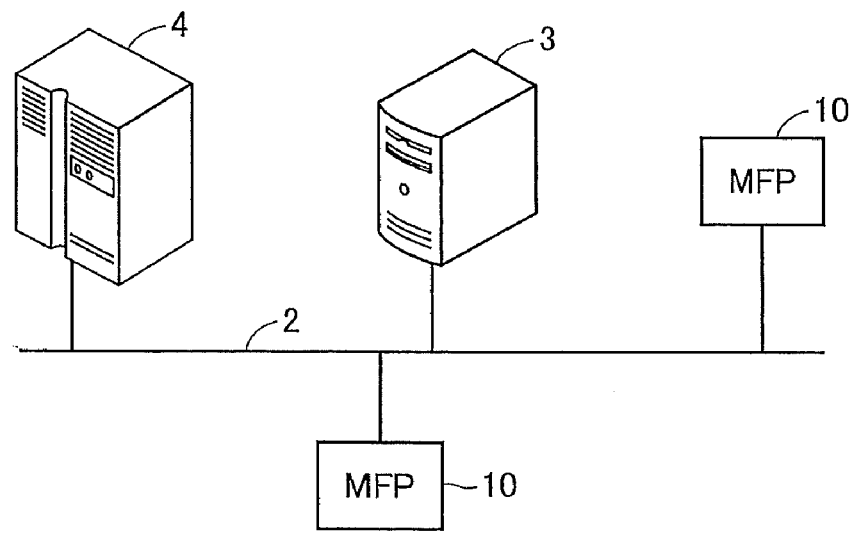
FIG. 1 illustrates a configuration of a charging system according to an embodiment of the present invention.

Embodiments of the present invention will be described hereinafter with reference to the drawings. In the following description, like parts or components are denoted by like reference characters. Like parts or components are named and function likewise as well.

FIG. 1 will be used to describe a configuration of a charging system according to an embodiment of the present invention.

Referring to FIG. 1, charging system 1 according to an embodiment of the present invention includes a charging management server 3, an MFP 10 and a cooperative server 4 which is an external server performing a process in cooperation with MFP 10, each connected to a network 2. While two MFPs are provided in the description here by way of example, the number of MFPs is not particularly limited to two, and any number of MFPs may be provided.

Network 2 is configured to make wired connections or connections via wireless LAN (Local Area Network) using the TCP/IP protocol (Transmission Control Protocol/Internet Protocol), so that various data can be communicated between the connected components.

Charging management server 3 includes a charging table as described hereinafter that stores charging information for each user. In response to a request from MFP 10, charging management server 3 transmits and receives the charging table in which charging information for each user is stored.

Cooperative server 4 executes an application program in response to a request to perform a job process from MFP 10. By way of example, cooperative server 4 decrypts encrypted data stored in a U3 memory or the like, performs the function of OCR, or translation between English and Japanese, for example.

MFP 10 has functions such as scanner function for scanning an original, print function for forming an image on a recording medium such as paper based on image data, and user authentication function, for example, as described hereinafter. In the present embodiment, by way of example, a user authentication process corresponding to the user authentication function uses an ID (Identification) number stored in a dedicated card provided for each user. The user authentication process, however, is not particularly limited to the use of the ID number stored in a dedicated card, and may use biometric authentication such as fingerprint authentication, or a user may enter an authentication code to be compared with a certain code. In other words, as long as a user can be identified by any means and MFP 10 can obtain a charging table associated with the user, any means may be used.

Figure 2:
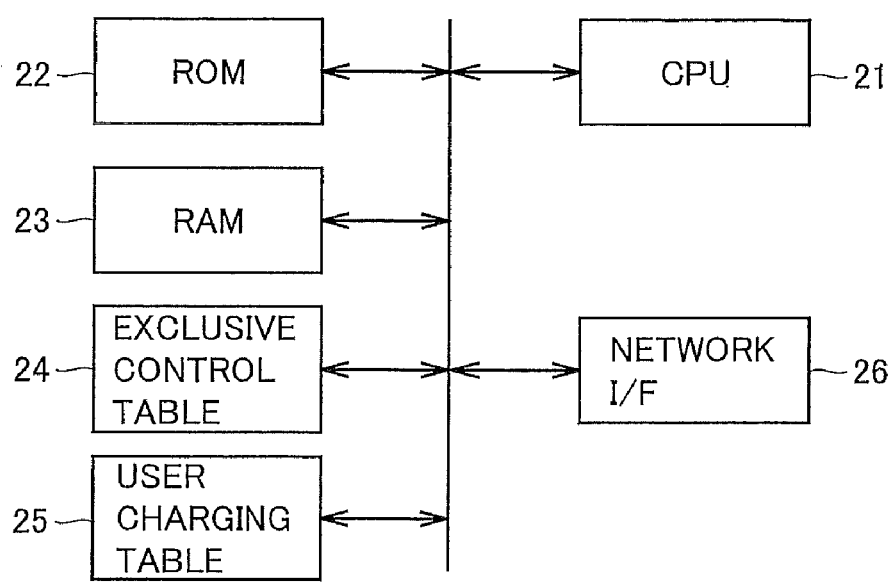
FIG. 2 is a schematic block diagram illustrating a configuration of a charging management server according to an embodiment of the present invention.

FIG. 2 will be used to describe a configuration of charging management server 3 according to an embodiment of the present invention.

Referring to FIG. 2, charging management server 3 according to an embodiment of the present invention includes a CPU (Central Processing Unit) 21, a ROM (Read-Only memory) 22, a RAM (Random Access Memory) 23, an exclusive control table 24, a user charging table 25, and a network I/F 26.

CPU 21 reads from ROM 22 a program necessary for the management of charging, and performs unified control of respective operation timings of the constituent members. Further, based on exclusive control table 24, CPU 21 controls permission or inhibition of access to user charging table 25.

When CPU 21 receives, from network I/F 26, a request to read information about charging for a user, CPU 21 reads from user charging table 25 a charging table storing information about charging for the user for which the request to read information about charging is received, and sends the read charging table.

Further, when CPU 21 receives a request to rewrite the result of use by the user, CPU 21 updates the charging table storing the information about charging for the user, in user charging table 25.

ROM 22 stores a program necessary for the management of charging, such as various programs for updating user charging table 25, for example.

RAM 23 is a volatile memory used as a work area when CPU 21 executes a program.

Exclusive control table 24 is a table for restricting access to user charging table 25 from a plurality of MFPs 10 by the same user.

User charging table 25 stores a charging table for managing the balance of an advance payment by each user and a list of fees for respective jobs for each user.

Network I/F 26 transmits and receives data to and from an external device such as MFP 10 according to an instruction from CPU 21.

FIG. 3 will be used to describe the contents of exclusive control table 24 according to an embodiment of the present invention.

Referring to FIG. 3, exclusive control table 24 according to an embodiment of the present invention includes a field for an ID number for identifying a user and a field for an exclusive control flag. In the ID number field, an identification number associated in advance with a user is stored. In the exclusive control flag field, data "0" represents permission of access to user charging table 25, and data "1" represents inhibition of access to user charging table 25.

FIG. 4 will be used to describe the contents of user charging table 25 according to an embodiment of the present invention.

Referring to FIG. 4, a field for the value of "counter," a field for the value of "counter upper limit" and a field for respective "unit prices" for respective jobs are shown that are associated with "ID number" of a user.

In the "counter" value field, a value corresponding to a fee for use of MFP 10 for example up to the present is written. In the "counter upper limit" value field, a value corresponding to an advance payment by a user is written. In the "unit price" field, basic unit price information to be used for determining a fee for use required for execution of each job process is registered.

The basic unit price information is constituted of, by way of example, a copy job and a print job that can be executed by MFP 10, and various jobs including a decryption job, an OCR job, an English-Japanese translation job, and a Japanese-English translation job that can be executed by cooperative server 4, and is determined according to a combination of charging bases including paper size, page or the number of characters. Respective "unit prices" for respective job processes for each user may be set equal to each other, or different from each other like the one illustrated in the present embodiment.

In the present embodiment, the basic unit price information is as follows by way of example. When user A whose "ID number" is "00001" makes a copy in size A4, the counter is incremented by the unit price, namely 1. For other jobs, the counter is incremented similarly.

Figure 5:
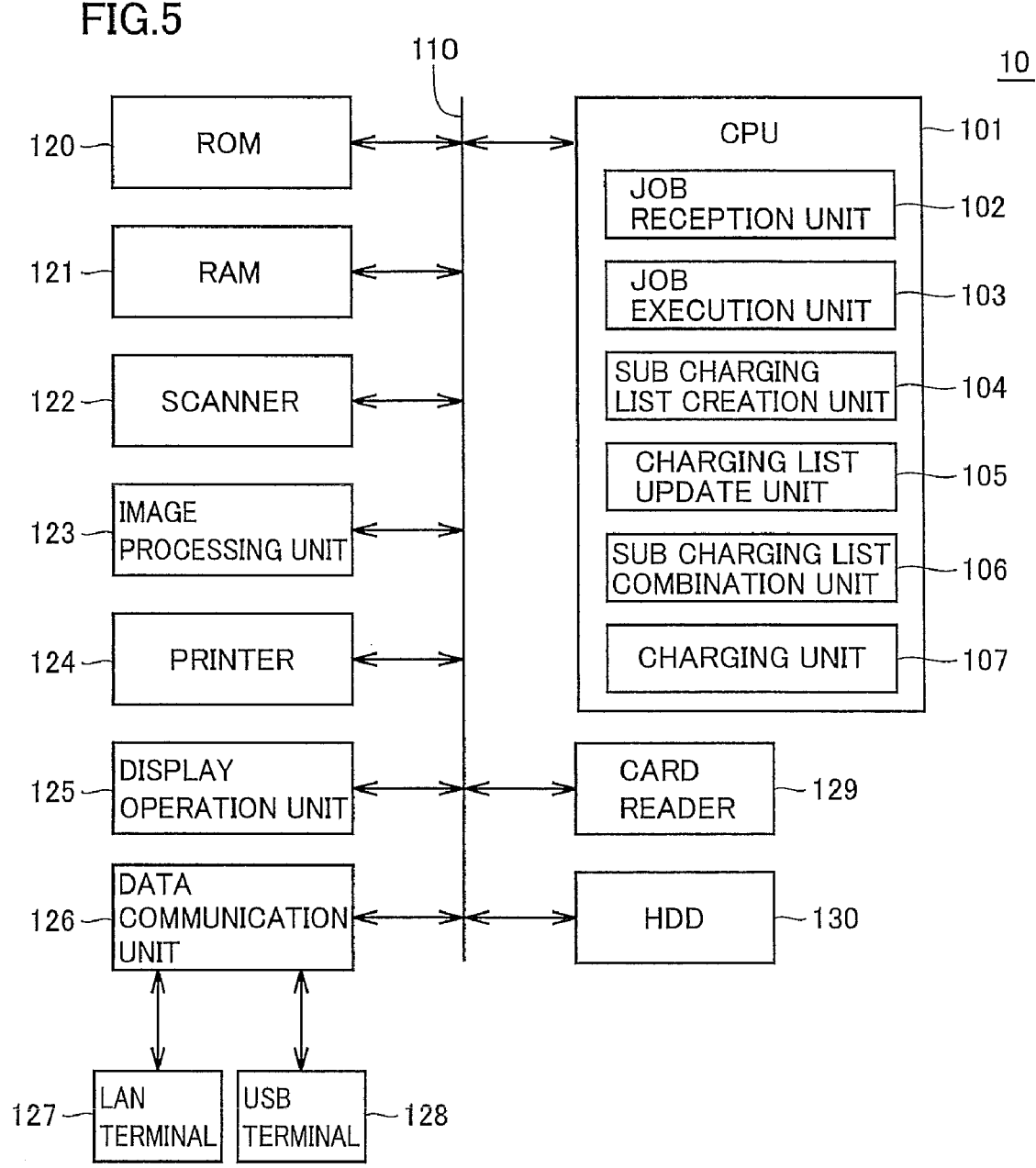
FIG. 5 is a schematic block diagram of an MFP according to an embodiment of the present invention.

FIG. 5 will be used to describe a schematic block diagram of MFP 10 according to an embodiment of the present invention.

Referring to FIG. 5, MFP 10 according to an embodiment of the present invention includes a CPU 101, a ROM 120, a RAM 121, a scanner 122, an image processing unit 123, a printer 124, a display operation unit 125, a data communication unit 126, a LAN terminal 127, a USB terminal 128, a card reader 129, and an HDD (Hard Disk Drive) 130. Further, these constituent members are connected by an internal bus 110 so that data can be communicated between them.

CPU 101 reads a necessary program from ROM 120, performs unified control of respective operation timings of the constituent members, and implements a scan job process, a copy job process and a print job process for example.

ROM 120 stores various programs for job processes for example and various fixed data for example.

RAM 121 is a volatile memory and serves as a work area when CPU 101 executes a program or a page memory for storing at least one page of image data for rotating the image, for example.

Scanner 122 includes a light source for illuminating an original, a line image sensor for scanning one line of the original in the direction of the width of the original, moving means for moving the position where the original is scanned line by line in the longitudinal direction of the original, and an optical path including a lens and a mirror for directing the light reflected from the original to the line image sensor to form an image, and scans an original image and takes in the corresponding image data. The line image sensor is formed of a CCD (Charge Coupled Device). An analog image signal that is output from the line image sensor is A/D converted, and taken in as the digital image data.

Image processing unit 123 enlarges, reduces or rotates image data, or compresses or expands image data.

Printer 124 includes a recording paper transport device, a photoreceptor drum, a charger, a laser unit, a developing device, a transfer separation device, a cleaning device, and a fixing device for outputting an image by forming the image corresponding to image data on recording paper through an electrophotographic process.

Display operation unit 125 includes an operation panel constituted of a liquid crystal display whose surface has a touch panel as well as various operation switches, for example, for displaying various guidance messages and statuses to a user or receiving various operational instructions from the user.

Data communication unit 126 includes LAN terminal 127 that is an interface for making communication according to a communication protocol such as TCP/IP, and USB (Universal Serial Bus) terminal 128 that is a serial communication interface, for transmitting and receiving data to and from an external device, USB memory for example, connected to LAN terminal 127 or USB terminal 128, following an instruction from CPU 101.

A dedicated card prepared for a user and having an ID number written in advance is inserted into card reader 129, and thus the ID number is obtained.

A magnetic card or the like is used as the dedicated card, and an ID number is recorded on the card as user identifying information for uniquely specifying a registered user. Here, the dedicated card is given to each user from a manager. Further, when the dedicated card is issued, charging management server 3 registers, in user charging table 25, a charging table in which charging information associated with the ID number is stored.

HDD 130 stores compressed image data and print data for example.

CPU 101 includes a job reception unit 102, a job execution unit 103, a sub charging list creation unit 104, a charging list update unit 105, a sub charging list combination unit 106, and a charging unit 107.

Job reception unit 102 receives an instruction to execute a job that is entered by a user by operating display operation unit 125.

Job execution unit 103 executes the job process in response to the entered instruction to execute the job process.

Sub charging list creation unit 104 newly creates a sub charging list based on the balance of the counter in a charging list, as described hereinafter. In the present embodiment, when a job is executed using cooperative server 4, a relevant sub charging list is created for MFP 10.

Charging list update unit 105 updates the charging list based on the creation of the sub charging list or the sub charging list transmitted thereto.

Sub charging list combination unit 106 combines the transmitted sub charging list and the charging list into one charging list.

Charging unit 107 executes a charging process according to the charging list in response to execution of a job by job execution unit 103.

Figure 6:
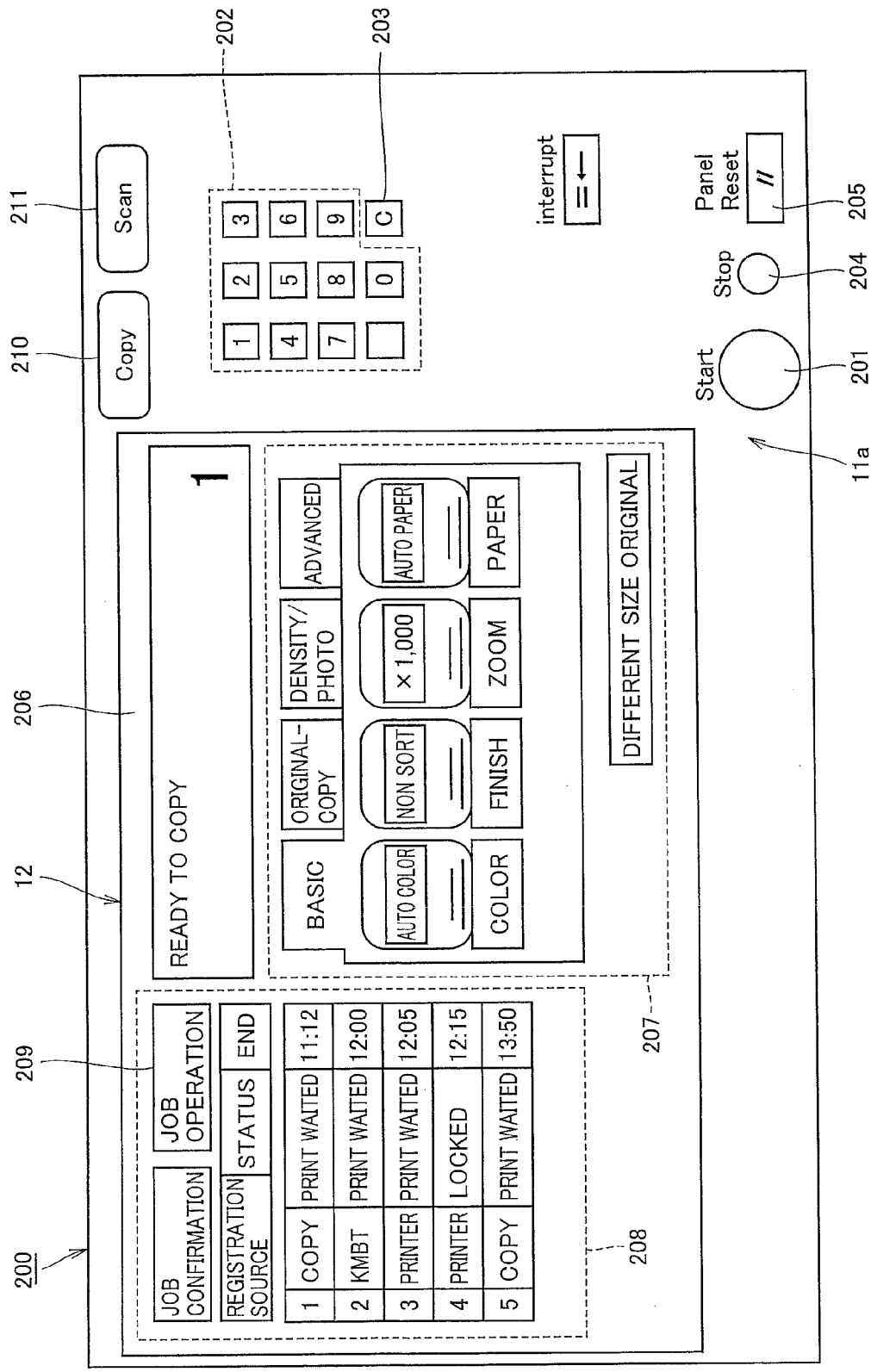
FIG. 6 illustrates a configuration of an operation panel constituting a display operation unit of the MFP according to an embodiment of the present invention.

FIG. 6 will be used to describe a configuration of an operation panel 200 constituting display operation unit 125 of MFP 10 according to an embodiment of the present invention.

Referring to FIG. 6, a start key 201 is used for starting an operation such as copy/scan. A ten key 202 is used for entering a numerical value such as the number of copies to be made or a password as described hereinafter. A clear key 203 is used for clearing the entered numerical value and discarding accumulated image data.

A stop key 204 is used for giving an instruction to stop a copy/scan operation. A panel reset key 205 is used for discarding a mode and a job as set. When stop key 204 is pressed while a data writing process or data printing process is performed for a USB device, the data writing operation or data printing operation for the USB device is stopped.

To an operation display 12, a touch panel 206 is attached for displaying various modes and making settings, for example.

A user can use this touch panel 206 to make various settings according to what is displayed in operation display 12. In a setting screen area 207 of touch panel 206, usually buttons are arranged for making basic/advanced settings when a copy operation or scan operation is performed. In response to pressing of each button, a hierarchical screen for making detailed settings is displayed.

In a job information screen area 208 of touch panel 206, information about jobs entered to MFP 10 at that time is displayed. On the display, jobs are arranged in order of jobs to be performed. When an operation such as delete or change for example is performed on a certain job, a job operation button 209 is selected and thereafter a job number button to be operated is pressed. These operations cause a job operation screen to be displayed so that operation on a certain job can be carried out.

A copy (COPY) key 210 and a scan (SCAN) key 211 are selection keys for specifying one of the copy and scanner modes in which MFP 10 is to be operated.

When copy key 210 is pressed, MFP 10 is available as copier. In this state, the scanner operation cannot be performed.

When scan key 211 is pressed, MFP 10 is available as scanner. In this state, the copy operation cannot be performed.

Copy key 210 and scan key 211 are operated exclusively. When one is selected, the other automatically enters a non-selected state.

Figure 7:
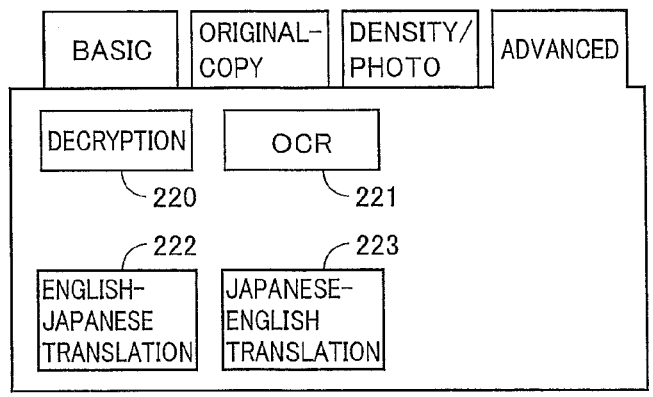
FIG. 7 illustrates a screen displayed in a setting screen area when "advanced" button is pressed.

FIG. 7 will be used to describe a screen displayed when an "advanced" button is pressed on setting screen area 207.

Referring to FIG. 7, command buttons are shown that are displayed when the "advanced" button is pressed. Specifically, various command buttons for operations cooperatively performed by cooperative server 4 are shown.

By way of example, a "decryption" button 220, an "OCR" button 221, an "English-Japanese translation" button 222, and a "Japanese-English translation" button 223 are provided. In response to pressing of one of the various buttons, an instruction to perform a job process corresponding to the button is given to external cooperative server 4.

Figure 8:
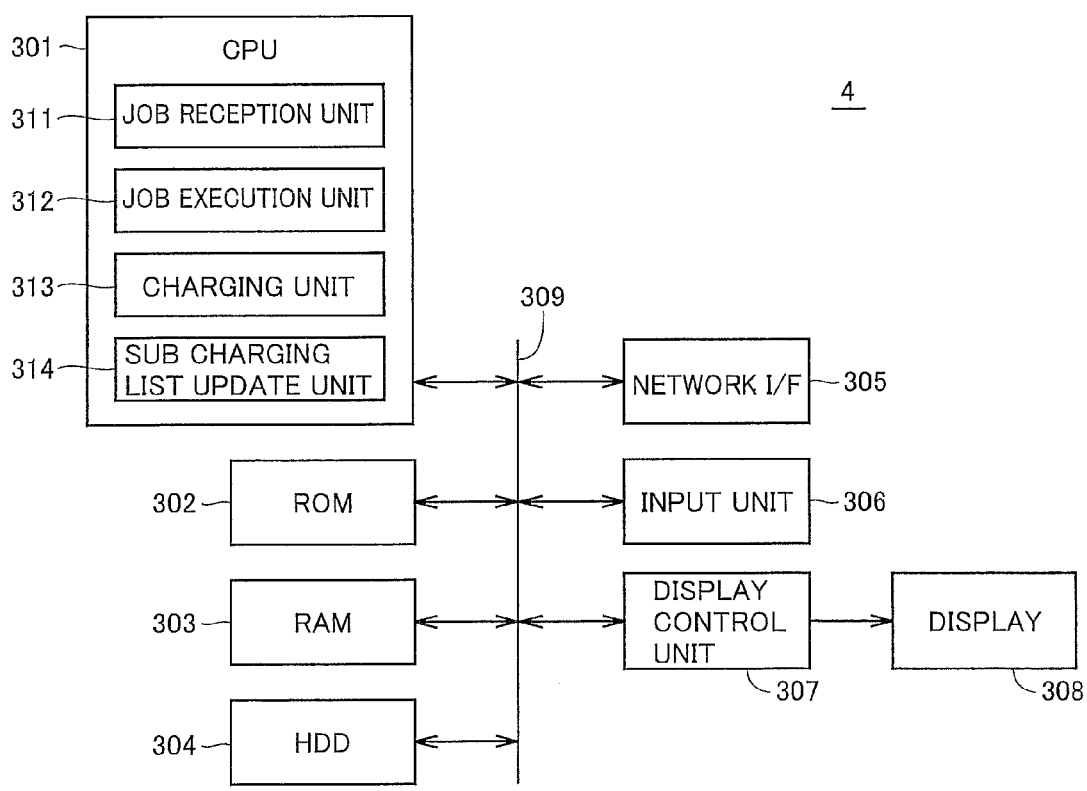
FIG. 8 is a block diagram illustrating a schematic configuration of a cooperative server according to an embodiment of the present invention.

FIG. 8 will be used to describe a schematic configuration of cooperative server 4 according to an embodiment of the present invention.

Referring to FIG. 8, cooperative server 4 according to an embodiment of the present invention includes a CPU (Central Processing Unit) 301 for executing various programs including an operating system (OS), a ROM 302, a RAM 303 for temporarily storing data necessary for execution of a program by CPU 301, a hard disk drive (HDD) 304 for storing a program executed by CPU 301 in non-volatile manner, a network I/F 305, an input unit 306, a display control unit 307, and a display 308.

CPU 301 controls the whole of the apparatus, ROM 302 stores a BIOS and a boot program, and RAM 303 is a volatile memory and serves as a work area when CPU 301 executes a program.

CPU 301 includes a job reception unit 311, a job execution unit 312, a charging unit 313, and a sub charging list update unit 314.

HDD 304 stores an OS, applications, drivers, various programs and data files, for example. Regarding the applications, application programs for executing extended functions for image data transmitted from MFP 10 are stored. In the present embodiment, by way of example, a decryption program for decrypting encrypted data, an OCR process program for performing an OCR process, an English to Japanese translation program for translating English to Japanese, and a Japanese to English translation program for translating Japanese to English are stored.

Network I/F 305 transmits and receive data to and from an external device via a LAN following a communication protocol such as TCP/IP.

Input unit 306 is an input device such as keyboard and mouse,

Display control unit 307 is controlled by CPU 301 to write image data in a video memory, and output to display 308 the image data stored in the video memory, in the form of a video signal.

Display 308 is a display device that is typically a liquid crystal display or CRT.

When cooperative server 4 is powered on, CPU 301 loads the OS from HDD 304 to RAM 303 and loads various device drivers according to the boot program of ROM 302. Further, CPU 301 loads to RAM 303 and executes a relevant program to be cooperatively operated by cooperative server 4.

Job reception unit 311 of CPU 301 receives a job specified by MFP 10, and job execution unit 312 executes the received job. Charging unit 313 performs a charging process for the executed job, and sub charging list update unit 314 updates a sub charging list according to the charging process.

Such a program or the like may be read by an FD (Floppy Disk) drive or CD-ROM (Compact Disc-Read Only Memory) drive (not shown) from a flexible disc or CD-ROM to be stored in HDD 304, or the program may be stored via a network.

Figure 9:
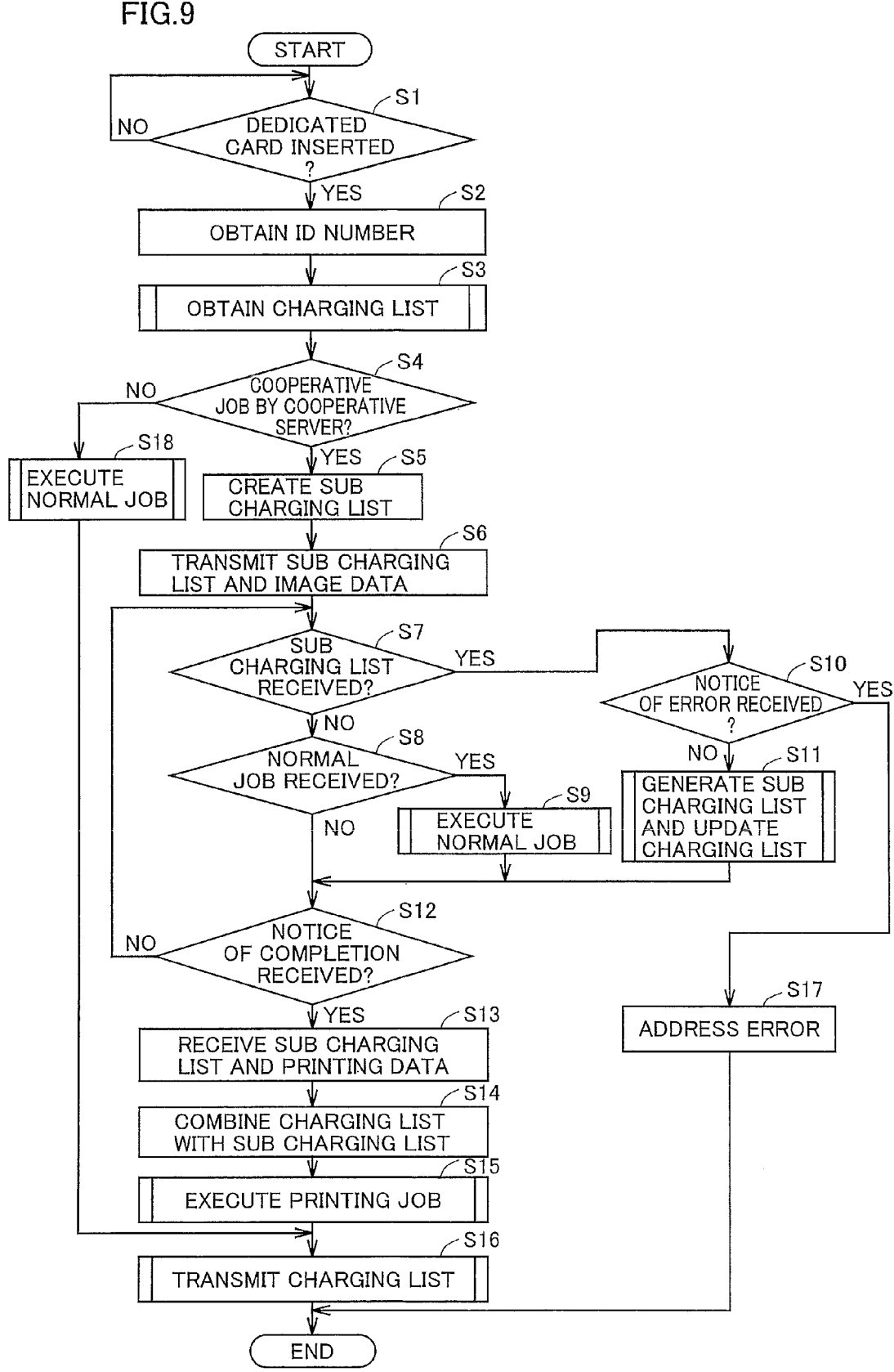
FIG. 9 illustrates a flow of a main routine for a control operation of the MFP according to an embodiment of the present invention.

FIG. 9 will be used to describe a flow of a main routine for a control operation of MFP 10 according to an embodiment of the present invention.

Referring to FIG. 9, it is determined first whether or not a dedicated card is inserted in card reader 129 of MFP 10 (step S1).

When the dedicated card is inserted, the ID number of the user stored in the dedicated card is then obtained (step S2).

Next, a process for obtaining a charging list from charging management server 3 is performed (step S3). Specifically, MFP 10 outputs to charging management server 3 a request to read a charging table in order to obtain the charging list.

Figures 10, 11:
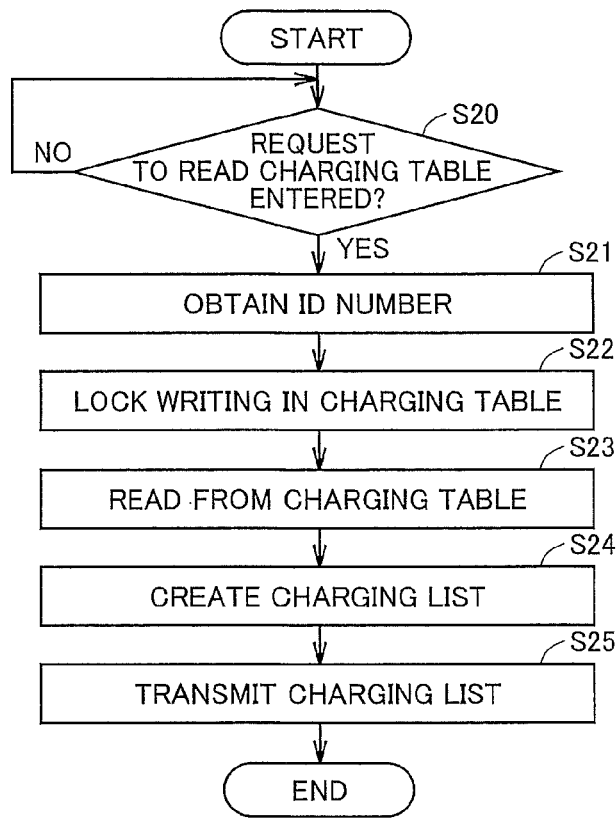
FIG. 10 is a flow diagram illustrating a process for obtaining a charging list from the charging management server according to an embodiment of the present invention.
FIG. 11 illustrates the contents of a charging list as generated according to an embodiment of the present invention.

FIG. 10 will be used to describe the process for obtaining a charging list from charging management server 3 according to an embodiment of the present invention.

Referring to FIG. 10, CPU 21 of charging management server 3 determines whether or not a request to read a charging table is input from MFP 10 via network I/F 26 (step S20). Here, the request to read a charging table also includes the ID number of the user.

When the request to read a charging table is input in step S20, CPU 21 obtains the ID number of the user included in the request to read a charging table (step S21).

Then, CPU 21 refers to exclusive control table 24 to lock the writing in user charging table 25 (step S22). Specifically, in the cell for the exclusive control flag in the same row as the ID number of the user, "0" is changed to "1."

Then, CPU 21 reads all of the cells in the same row as the ID number of the user in user charging table 25 (step S23).

CPU 21 accordingly creates a charging list 27 associated with the user (step S24).

Then, CPU 21 transmits charging list 27 to MFP 10 via network I/F 26 (step S25). The process is accordingly ended (END).

In this way, MFP 10 obtains charging list 27 transmitted from charging management server 3.

FIG. 11 will be used to describe the contents of created charging list 27 according to an embodiment of the present invention.

Referring to FIG. 11, as an example of charging list 27 according to an embodiment of the present invention, charging list 27 for user A with the user ID number "00001" is shown. Charging list 27 for user A is created by extracting respective contents of all cells in the same row as the ID number of user A in user charging table 25.

"Counter" value "88," "counter upper limit" value "4000," and respective "unit prices" for respective job processes (copy, print for example) associated with the user "ID number" of "00001" are shown.

Referring again to FIG. 9, it is determined next whether or not a cooperative job to be executed by cooperative server 4 is received (step S4). Specifically, it is determined that a cooperative job is received, based on the fact that one of "decryption" button 220, "OCR" button 221, "English-Japanese translation" button 222 and "Japanese-English translation" button 223 is pressed in setting screen area 207 of FIG. 7 as described above.

The cooperative job to be executed by the cooperative server refers to decryption job, OCR process job, English to Japanese translation job, and Japanese to English translation job, for example, that can be performed by cooperative server 4 provided outside as described above. Due to deficiency in processing ability or the fact that different OSs are employed in cooperative server 4 and MFP 10 respectively, the cooperative job cannot be handled by MFP 10 and is accordingly performed by cooperative server 4.

Then, a sub charging list is generated (step S5). Specifically, sub charging list creation unit 104 creates the sub charging list for cooperative server 4 according to the balance of the counter in charging list 27.

Then, the generated sub charging list and image data are transmitted to cooperative server 4 (step S6). An instruction to execute a job to be handled by cooperative server 4 is also transmitted.

The image data may also include encryption data conforming to the U3 standard without page break, English or Japanese text data, for example.

FIG. 12 will be used to exemplarily describe a procedure for creating a sub charging list according to an embodiment of the present invention.

Referring to FIG. 12, charging list 27 shown on the left corresponds to the charging list before a sub charging list is created, and is identical to the charging list in FIG. 11 as described above.

Sub charging list creation unit 104 creates a sub charging list 28 according to the balance of the counter in charging list 27. Specifically, from the items in the original charging list, the ID number and respective unit prices for the decryption job, OCR process job, English to Japanese translation job, and Japanese to English translation job that can be executed by cooperative server 4 are transferred as they are to the sub charging list. Since the sub charging list is newly generated, the "counter" value is set to "0."

In the present embodiment, by way of example, a half of the balance of the counter in the charging list (balance of the counter="counter upper limit" value−"counter" value) is transferred to the sub charging list.

Specifically a half of the balance of the counter in the charging list, (4000−88)/2=1956 is written in the cell for "counter upper limit" value in sub charging list 28.

In response to the creation of sub charging list 28 by sub charging list creation unit 104, charging list update unit 105 updates charging list 27 to a charging list 29. In the cell for the "counter" value in charging list 29, since a half of the balance of the counter is transferred to sub charging list 28 as created, the counter value is rewritten to 88+1956=2044.

Here, a process of cooperative server 4 will be described.

Figure 13:
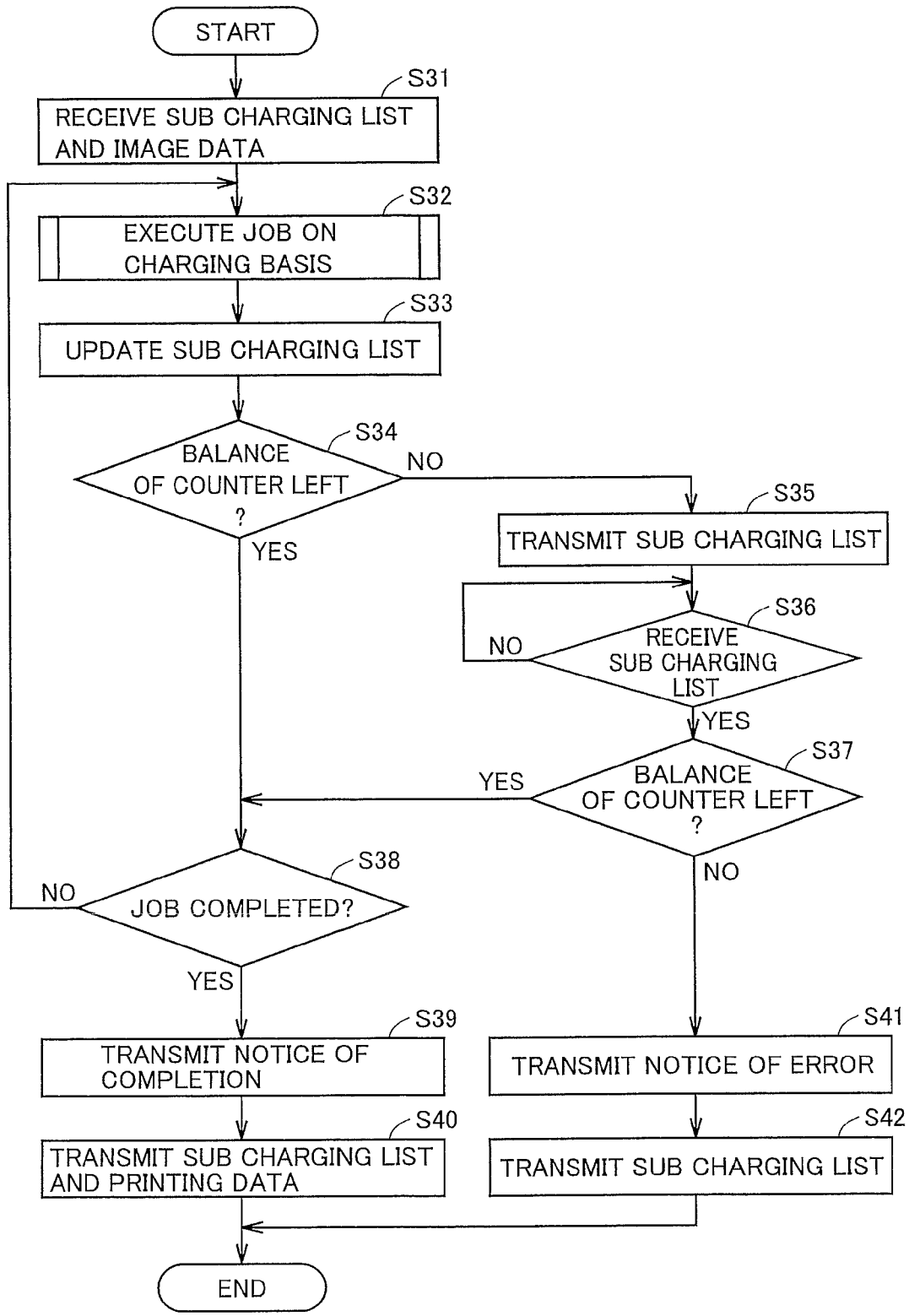
FIG. 13 is a flow diagram showing details of a main routine of a control operation of the cooperative server.

FIG. 13 will be used to describe a flow diagram illustrating details of a main routine for a control operation of cooperative server 4.

Referring to FIG. 13, cooperative server 4 receives from MFP 10 sub charging list 28 and image data (step S31). At this time, cooperative server 4 also receives an instruction to execute a job to be handled by cooperative server 4.

Specifically, job reception unit 311 of CPU 301 receives the sub charging list and image data as well as details of the specified job via network I/F 305.

Then, job execution unit 312 executes the job on the basis of charging (step S32). This process will be described hereinafter. The result of execution of the job is print data.

Next, the sub charging list is updated based on charging data after the job is executed (step S33).

Specifically, charging unit 313 performs a charging process based on the execution of the job, and sub charging list update unit 314 updates the sub charging list according to the charging data based on the charging process.

Then, CPU 301 compares the counter value with the counter upper limit value of the sub charging list to determine whether the counter value is left, namely whether the balance of the counter is left (step S34).

When the balance of the counter is left in step S34, CPU 301 then determines whether or not the job is completed (step S38).

When it is determined in step S38 that the job is completed, CPU 301 transmits a notice of completion to MFP 10 (step S39).

Then, CPU 301 transmits the sub charging list and print data to MFP 10 (step S40). The process is accordingly ended (END).

When it is determined in step S38 that the job has not been completed, the process returns to step S32 where the job is executed on the basis of charging and the process is repeated until the job is completed.

When CPU 301 in step S34 determines whether or not the counter value is left by comparing the counter value with the counter upper limit value in the sub charging list and determines that there is no balance of the counter, CPU 301 then transmits the sub charging list (step S35).

Next, after transmitting the sub charging list to MFP 10, CPU 301 determines whether or not the sub charging list transmitted again from MFP 10 is received (step S36). The re-reception of the sub charging list transmitted from MFP 10 will be described hereinafter.

In step S36, reception of the sub charging list is waited for. When the sub charging list is received, the process proceeds to the next step S37.

When the sub charging list is received, CPU 301 determines whether or not the balance of the counter is left in the received sub charging list (step S37).

When CPU 301 determines in step S37 that the balance of the counter is left in the received sub charging list, the process proceeds to step S38. It is determined whether or not the job is completed as described above, and the above-described process is repeated until the job is completed. In other words, when it is determined in step S34 that there is no balance of the counter and thereafter it is determined that there is a balance of the counter based on the sub charging list transmitted from MFP 10, the job can be continued even if the job was ceased before completed.

When CPU 301 determines in step S37 that the received sub charging list includes no balance of the counter, CPU 301 transmits a notice of error (step S41).

Then, the sub charging list is transmitted (step S42). The process is accordingly ended (END).

In other words, even if the sub charging list transmitted from MFP 10 is received again, the execution of the job cannot be continued if the balance of the counter is zero. Thus, the notice of error is transmitted and the sub charging list is transmitted to MFP 10.

In the following, a description will be given of a flow of job execution on the basis of charging by job execution unit 312 in step S32.

Figure 14:
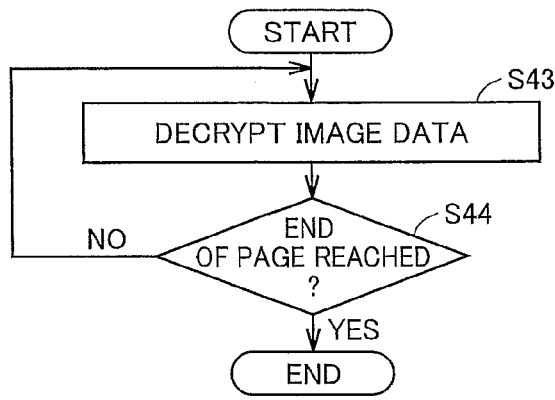
FIG. 14 illustrates a flow followed when a decryption job is executed.

FIG. 14 will be used to describe a flow followed when a decryption job is executed. Specifically, "decryption" button 220 in FIG. 7 is pressed for executing a decryption process on image data.

Referring to FIG. 14, the decryption job process is performed, namely the image data is decrypted (step S43). It is then determined whether or not a page end is reached (step S44), and the decryption process is repeated until the page end is reached. The process is then ended (END).

The basis of charging for the decryption process is a page. Each time one page is decrypted, the sub charging list is updated.

Figure 15:
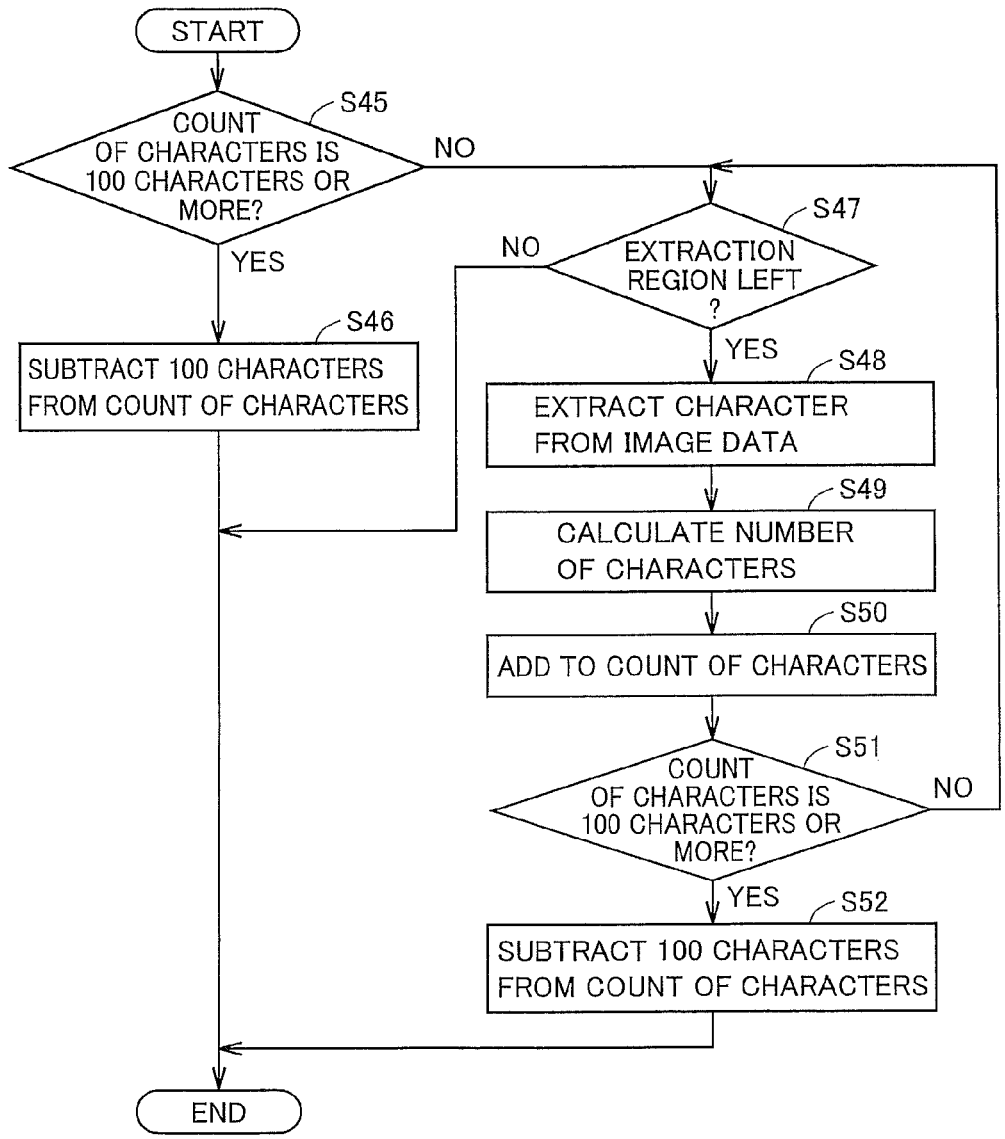
FIG. 15 illustrates a flow followed when an OCR job is executed.

FIG. 15 will be used to describe a flow followed when an OCR job is executed. Specifically, "OCR" button 221 in FIG. 7 is pressed for executing an OCR process on image data.

Referring to FIG. 15, it is determined whether or not the count of characters is 100 characters or more (step S45). The count of characters corresponds to the counter value used for calculation for charging, after the number of extracted characters is calculated as described hereinafter.

When it is determined in step S45 that the count of characters is 100 characters or more, 100 characters are subtracted from the count of characters (step S46), and the process is ended (END).

The OCR process is performed block by block, and uses 100 characters as a basis of charging. Therefore, 100 characters are subtracted from the count of characters for charging on the basis of 100 characters, and the job on the charging basis is ended.

When it is determined in step S45 that the count of characters is less than 100 characters, it is determined whether a character extraction region is left (step S47). In this embodiment, characters are extracted block by block from image data. After characters are extracted from the last block, it is determined in step S47 that there is no character extraction region, and the process is ended (END). Namely, the job on the charging basis is ended.

When it is determined in step S47 that there remains a character extraction region, characters are extracted from the image data (step S48). Specifically, characters are extracted block by block from image data. The process of extracting characters block by block that is a group of characters in image data is performed following a known method, and details thereof will not be explained here. The determination here can be made, for example by detecting a blank region in the image data.

Then, the number of extracted characters in the character extraction process is calculated (step S49).

Then, the calculated number is added to the count of characters (step S50).

It is then determined whether or not the count of characters is 100 characters or more (step S51).

When it is determined in step S51 that the count of characters is 100 characters or more, 100 characters are subtracted from the count of characters (step S52). The process is then ended (END). Since a fee is charged on the basis of 100 characters, 100 characters are subtracted from the count of characters and the job on the basis of charging is ended.

When it is determined in step S51 that the count of characters is less than 100 characters, the process returns to step S47, and the above-described process is repeated.

In the present embodiment, characters are extracted block by block from image data. After characters are extracted from the last block, it is determined that there is no character extraction region and the process is ended (END). Namely, the job on the basis of charging is completed.

In other words, the character extraction process is performed and the job is executed on the charging basis of 100 characters based on the counter value corresponding to the count of characters.

While the OCR job has been described here, a similar method may be used to perform a translation process such as English to Japanese translation job or Japanese to English translation job.

In the present embodiment, while the character extraction process is carried out, when there is no extraction region on the block basis and the count of characters is less than 100 characters, the count of characters is rounded up to 100 characters for charging a fee. Alternatively, when the count of characters is less than 100 characters, the count may be rounded down to charge no fee.

Referring again to FIG. 9, CPU 101 then determines whether or not the sub charging list transmitted from cooperative server 4 is received (step S7). This determination is made, in the case where the balance in the sub charging list transmitted to cooperative server 4 is spent and the sub charging list is transmitted from cooperative server 4, for determining whether or not the sub charging list transmitted from cooperative server 4 is received. When the sub charging list is received, the process proceeds to step S10.

When it is determined in step S7 that the sub charging list is not received, it is determined whether or not a normal job is received (step S8).

In step S8, when it is determined that a normal job is received, the normal job is then carried out (step S9). Specifically, job execution unit 103 performs the specified normal job. The normal job refers to copy job, print job or scan job, for example.

When it is determined in step S8 that a normal job is not received, the process proceeds to the next step S12 where it is determined whether or not a notice of completion is received (step S12). Specifically, it is determined whether or not a notice of completion transmitted from cooperative server 4 in response to the end of a job is received.

When it is determined in step S12 that the notice of completion is not received, the process returns to step S7 to repeat the above-described process until the notice of completion is transmitted from cooperative server 4.

When it is determined in step S12 that CPU 101 receives the notice of completion from cooperative server 4, CPU 101 receives sub charging list 28 and print data (step S13).

Then, sub charging list 28 and charging list 29 are combined (step S14).

FIG. 16 will be used to exemplarily describe a procedure for combining a sub charging list and a charging list according to an embodiment of the present invention.

Referring to FIG. 16, sub charging list 28 and charging list 29 before combined are shown on the left, and a charging list 30 generated after the lists are combined is shown on the right.

In sub charging list 28, the "counter" value is 10, which is less than the "counter upper limit" value "1956." Therefore, a balance of the counter is left.

In charging list 29, the "counter" value is 2064 and the "counter upper limit" value is "4000."

Sub charging list 28 and charging list 29 are combined. The balance of the counter in the charging list generated by the combination is determined as follows. The balance of the counter in the sub charging list, namely "counter upper limit" value−"counter" value, is transferred to the charging list by subtracting the balance of the counter in the sub charging list from the counter value in the charging list. Specifically, the balance of the counter in the sub charging list, namely 1956−10=1946, is subtracted from the "counter" value 2046 in the charging list, and accordingly the "counter" value is rewritten to 2064−1946=118.

Referring again to FIG. 9, a printing job is executed (step S15).

The charging list is transmitted (step S16). The process is then ended (END).

FIG. 17 will be used to describe execution of the printing job according to an embodiment of the present invention.

Referring to FIG. 17, job execution unit 103 executes the printing job (step S80). Specifically, based on printing data, a print job is carried out for example. While execution of a print job will be described here, a scan job or the like may be executed instead. The job to be executed here is not particularly limited to the print job.

Then, the charging list is updated (step S81). Specifically, charging unit 107 performs a charging process based on the execution of the job, and charging list update unit 105 updates the charging list based on charging data.

The process is then ended (END).

While the printing job has been described here, a normal job as described in connection with step S9 is carried out similarly. Specifically, job execution unit 103 performs a specified normal job, a charging process is performed based on the execution of the job, and charging list update unit 105 updates the charging list based on the charging data. The normal job refers to copy job, print job or scan job, for example.

Figure 18:
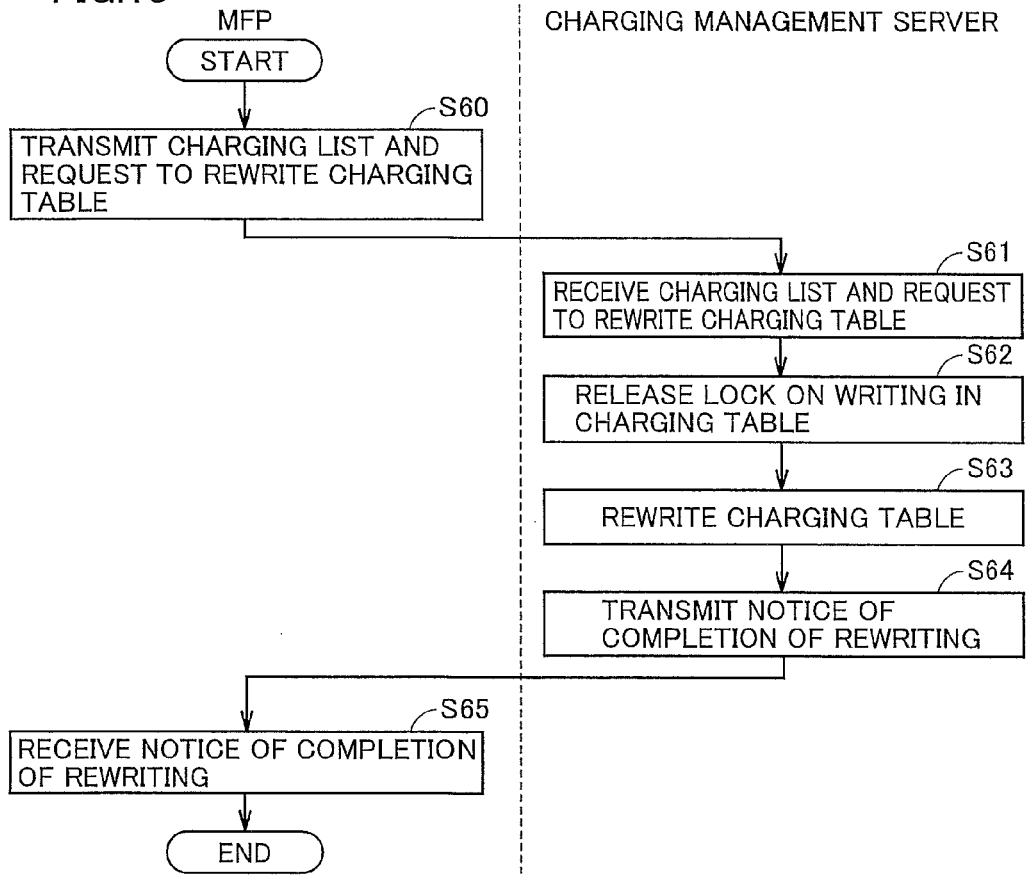
FIG. 18 is a flow diagram illustrating a process for transmitting a charging list according to an embodiment of the present invention.

FIG. 18 will be used to describe a process for transmitting a charging list according to an embodiment of the present invention.

Referring to FIG. 18, CPU 101 transmits a request to rewrite the charging table, together with the charging list, to charging management server 3 (step S60).

In charging management server 3, CPU 21 receives the request to rewrite the charging table together with the charging list (step S61).

Then, CPU 21 releases the lock on the writing in the charging table (step S62). Specifically, in order to release the lock on the writing, "1" is rewritten to "0" in the exclusive control flag cell in the same row as the relevant ID number in exclusive control table 24.

CPU 21 then rewrites the charging table (step S63). Specifically, the cell of the counter value in the same row as the ID number in user charging table 25 is overwritten with the counter value of the charging list.

Then, CPU 21 transmits a notice of completion (step S64).

In MFP 10, CPU 101 receives the notice of completion from charging management server 3 (step S65) and the process is ended (END).

In the case where a cooperative job to be executed by cooperative server 4 is not received in step S4, a normal job is carried out (step S18) and the process proceeds to step S16. Since the operation in step S18 is similar to the one described in connection with step S17, the detailed description thereof will not be repeated.

Here, a description will be given of the case where the sub charging list is received in step S7 of FIG. 9. Specifically, a description will be given of the case where the sub charging list is received before a notice of completion from cooperative server 4 is received.

When it is determined in step S7 that the sub charging list is received, CPU 101 determines whether or not a notice of error is received (step S10).

In FIG. 13, when there is no balance of the counter and the job is stopped without completed in cooperative server 4, the sub charging list is transmitted together with a notice of error, as described above.

Therefore, in such a case, the notice of error is received and the error is addressed (step S17). The process is then ended (END).

The error is addressed here by notifying a user of the fact that there is no balance of the counter and requesting the user to pay an additional fee. Alternatively, the user may be requested to insert into card reader 129 another card of the user in which a balance of the counter is left.

When the notice of error is not received in step S10, a sub charging list is created and the charging list is updated (step S11). The process then proceeds to step S12.

Figure 19:
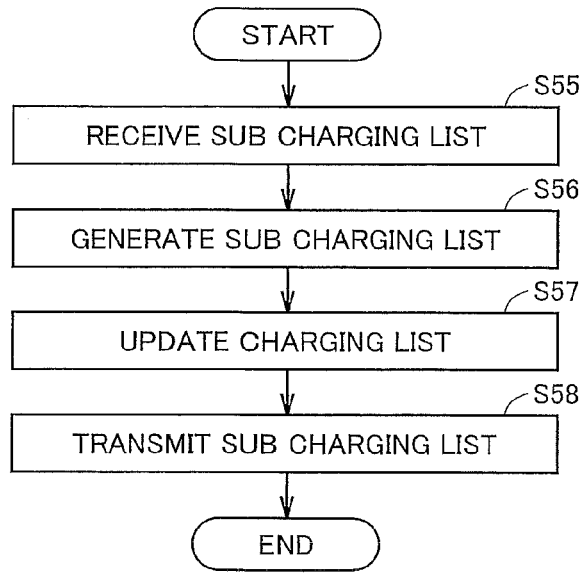
FIG. 19 is a flow diagram illustrating a process for creating a sub charging list and updating a charging list according to an embodiment of the present invention.

FIG. 19 will be used to describe creation of a sub charging list and update of a charging list according to an embodiment of the present invention.

Referring to FIG. 19, in the case where the sub charging list is received in step S7 of FIG. 9 and a notice of error is not received, CPU 101 of MFP 10 receives the sub charging list (step S55).

Then, sub charging list creation unit 104 of CPU 101 creates a sub charging list (step S56). Specifically, sub charging list creation unit 104 creates a sub charging list in response to the receipt of the sub charging list, based on the balance in the charging list.

According to the created sub charging list, charging list update unit 105 updates the charging list (step S57).

Then, CPU 101 transmits the created sub charging list (step S58).

Figure 20:
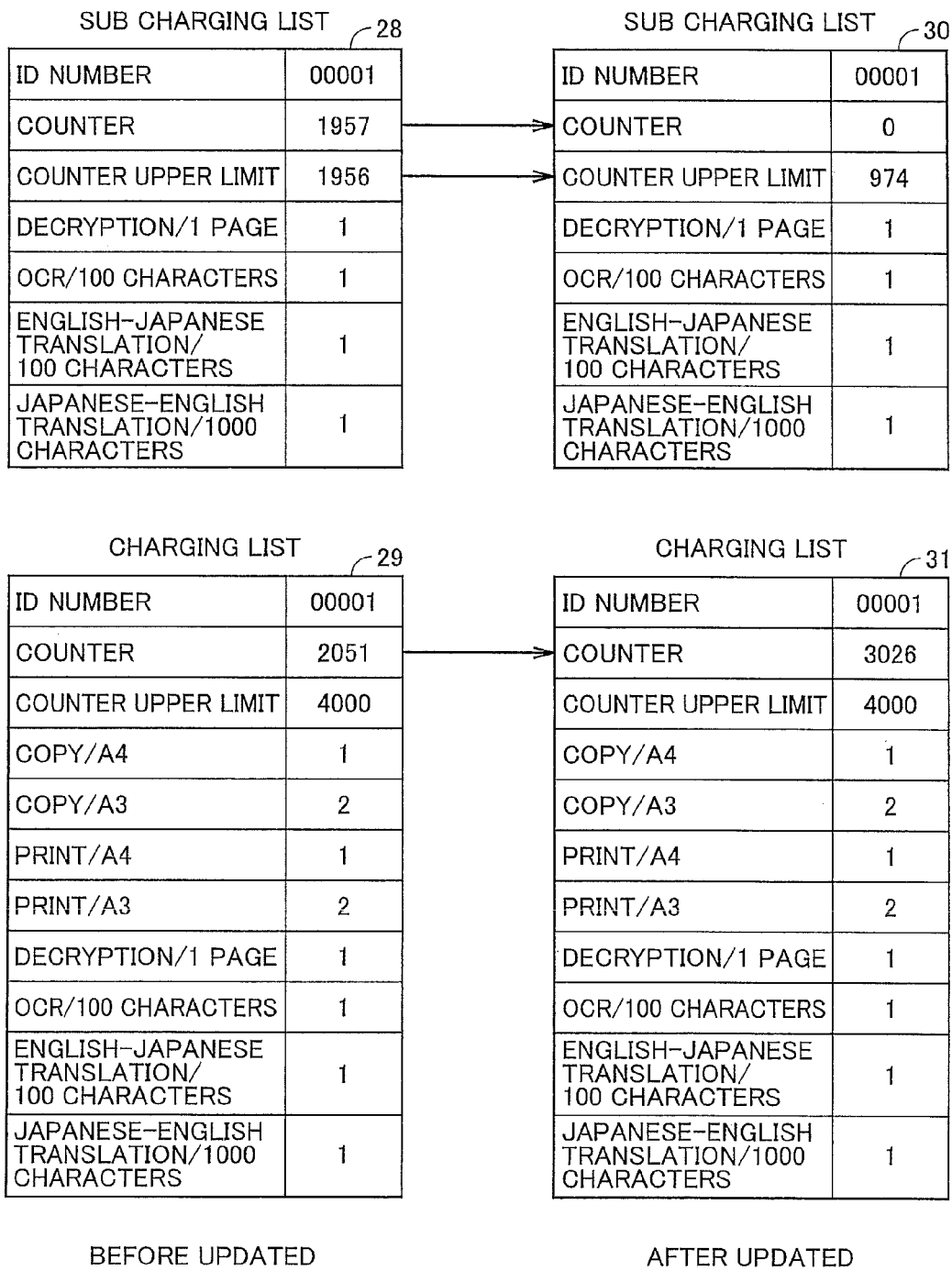
FIG. 20 schematically illustrates a procedure for updating a sub charging list according to an embodiment of the present invention.

FIG. 20 will be used to exemplarily describe a procedure for updating a sub charging list according to an embodiment of the present invention.

Referring to FIG. 20, sub charging list 28 as received and charging list 29 before update are shown on the left and sub charging list 30 to be transmitted and charging list 31 after update are shown on the right.

In received sub charging list 28, the "counter" value is not less than the counter upper limit value and there is no balance of the counter.

In the present embodiment, in consideration of the excessive use in sub charging list 28, a half of the balance of the counter (balance of the counter="counter upper limit" value−"counter" value) in charging list 29 is transferred to the sub charging list.

The excessive use in sub charging list 28 corresponds to "counter" value−"counter upper limit" value, namely "1."

The balance of the counter in charging list 29 in consideration of the excessive use in sub charging list 28 is determined by 4000−(2051+1), namely 1948. Thus, a half of the balance of the counter, (4000−2052)/2=974 is written as the counter upper limit.

In response to the creation of sub charging list 30 by sub charging list creation unit 104, charging list update unit 105 updates charging list 29 to charging list 31.

Specifically, in the cell for the "counter" value in charging list 31, the value is rewritten to 2051+1+974=3026, since a half of the balance of the counter is transferred to sub charging list 30 and the excessive use is considered when sub charging list 30 is created.

Through this process, new sub charging list 30 is transmitted to cooperative server 4. In step S36 of FIG. 13, the sub charging list is received and the job is continued within the range of the balance of the counter.

In the conventional system, when the balance in the sub charging list for cooperative server 4 is not left, the job process could be ceased without completed because the fee for use exceeds the limit. In the system according to the embodiment of the present invention, even for a job process by cooperative server 4 for which a fee for use cannot be predicted, the balance in the charging list of MFP 10 can be transferred to that for cooperative server 4 to prevent unintended cessation of the cooperative job by cooperative server 4.

FIG. 21 will be used to describe a flow of control for the whole charging system of the present invention.

Referring to FIG. 21, MFP 10 notifies charging management server 3 of an ID number stored in an IC (Integrated Circuit) card, and a user charging table of charging management server 3 is read (step S100).

Then, a new user charging list is transmitted to MFP 10.

When a cooperative job to be executed by the cooperative server is received by MFP 10 (step S101), a sub charging list is created (step S102).

The new sub charging list as created is transmitted together with image data to cooperative server 4.

Cooperative server 4 executes the job on the basis of charging (step S103).

As the job is executed on the basis of charging, the sub charging list is updated (step S104).

Here, in parallel with the execution of the cooperative job by cooperative server 4, MFP 10 may perform a normal job according to the charging list (step S106).

If the balance in the sub charging list for cooperative server 4 has been spent while the job is being executed, the sub charging list without balance is transmitted to MFP 10.

MFP 10 accordingly generates a sub charging list according to the balance of the counter in the charging list (step S107). The generated sub charging list is transmitted to cooperative server 4. If the job has been ceased without completed, the job is continued again based on the generated sub charging list.

When the job of cooperative server 4 is completed (step S105), a notice of completion of the job is transmitted together with the used sub charging list and printing data to MFP 10.

MFP 10 combines the charging list and the sub charging list (step S108), and executes a printing job (step S109).

MFP 10 then transmits the used charging list to charging management server 3.

Charging management server 3 accordingly rewrites the charging table (step S10), and transmits a notice of completion of rewriting to MFP 10. The process is accordingly completed.

As seen from above, while a user uses MFP 10 and cooperative server 4 to execute a cooperative process, MFP 10 has the charging list and simultaneously external cooperative server 4 has the sub charging list, and thus the user can use a normal job executed by MFP 10 without the need to wait for completion of the process by external cooperative server 4, which improves convenience.

Further, when the balance in the sub charging list for cooperative server 4 has been spent, the balance in the charging list for MFP 10 may be transferred to the sub charging list, so that unintended cessation of a cooperative job by cooperative server 4 for which a fee for use cannot be predicted can be prevented.

The image forming apparatus according to the present invention is not limited to the MFP, and the image forming apparatus may be any such as printer or facsimile apparatus, as long as the apparatus is an image forming apparatus. Regarding the controller for controlling the image forming apparatus, a program may be provided that causes a computer to function and execute the control as described above in connection with the flows. Such a program may be provided as a program product recorded on a computer-readable recording medium such as flexible disk, CD-ROM (Compact Disk-Read Only Memory), ROM (Read Only Memory), RAM (Random Access Memory), and memory card accompanying a computer. Alternatively, the program may be provided in the form recorded on a recording medium such as hard disk included in a computer. Further, a program may be provided in the form downloaded via a network.

The program according to the present invention may call, at a predetermined timing and in a predetermined order, necessary modules among program modules provided as a part of the operation system (OS) of a computer, to execute a process. In this case, the program itself does not include the above-described modules, and a process is carried out in cooperation with the OS. Such a program without module may also be included in the program of the present invention.

The program according to the present invention may be provided in the form incorporated in another program as a part of the other program. In this case as well, the program of the present invention itself does not include modules included in the other program, and a process is carried out in cooperation with the other program. Such a program incorporated in the other program may also be included in the program of the present invention.

The program product as provided is installed in a program storage such as hard disk to be executed. The program product includes a program itself and a recording medium on which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A charging system including an image forming apparatus having a charging list table, associated therewith, which lists charging information associated with users and is necessary for a charging process, and an external server connected with said image forming apparatus via a network for executing a job process in cooperation with said image forming apparatus, said image forming apparatus including:
a first controller for executing a job process while executing a charging process job by job within a range of a balance included in said charging list table; and
a first data transmission and reception device for transmitting and receiving data to and from said external server, wherein
said first controller (i) determines whether an instruction to execute a job process is given that requests said external server to execute said job, (ii) generates, when the instruction to execute is given, a charging list sub table associated with said external server within the range of the balance in said charging list table associated with the image forming apparatus, (iii) updates the balance in said charging list table according to the generation of said charging list sub table, and (iv) transmits said generated charging list sub table together with the job process that requests said external server to execute, to said external server via said first data transmission and reception device, and said external server including:
a second data transmission and reception device for transmitting and receiving data to and from said image forming apparatus; and
a second controller for executing the job process that requests said external server to execute, independently of said first controller of said image forming apparatus within a range of a balance included in said charging list sub table generated by said image forming apparatus and received by said second data transmission and reception device.

2. The charging system according to claim 1, wherein said charging list table includes a fee for use, an advance payment and charging information according to a job process.

3. The charging system according to claim 1, wherein said charging list sub table includes charging information according to a job process specific to said external server.

4. The charging system according to claim 1, wherein
said second controller of said external server (i) updates said charging list sub table job by job for the job process that said external server is requested to execute, (ii) determines whether the job process that said external server is requested to execute is completed, and (iii) transmits, when it is determined that the job process that said external server is requested to execute is completed, the updated charging list sub table to said image forming apparatus via said second data transmission and reception device, and
said first controller of said image forming apparatus combines said updated charging list sub table received via said first data transmission and reception device with said charging list table.

5. The charging system according to claim 1, wherein
said second controller of said external server (i) updates said charging list sub table job by job for the job process that said external server is requested to execute, (ii) determines whether a balance included in said updated charging list sub table has been spent while the job process that said external server is requested to execute is being executed, and (iii) transmits, when it is determined that the balance in said updated charging list sub table has been spent, said updated charging list sub table to said image forming apparatus via said second data transmission and reception device, and
said first controller of said image forming apparatus (i) generates another charging list sub table associated with said external server within the range of the balance in said charging list table, based on said updated charging list sub table received via said first data transmission and reception device, and (ii) transmits said generated another charging list sub table to said external server via said first data transmission and reception device.

6. A charging method for a charging system including an image forming apparatus having a charging list table associated therewith necessary for a charging process, and an external server connected with said image forming apparatus via a network for executing a job process in cooperation with said image forming apparatus, said charging method comprising the steps of:
receiving, at said image forming apparatus, input of an instruction to execute a job process, said instruction requesting that the external server execute said job process;

generating, at said image forming apparatus, when the instruction requests that said external server execute said job process, a charging list sub table associated with said external server within a range of a balance in said charging list table associated with said image forming apparatus;

updating said charging list table according to the generation of said charging list sub table;

transmitting, to said external server, said generated charging list sub table together with the job process that said external server is to be requested to execute; and executing, by said server, the job process that said external server is requested to execute, independently of said image forming apparatus, within a range of a balance included in said charging list sub table as received.

7. The charging method according to claim 6, wherein said charging list table includes a fee for use, an advance payment and charging information according to a job process.

8. The charging method according to claim 6, wherein said charging list sub table includes charging information according to a job process specific to said external server.

9. The charging method according to claim 6, further comprising the steps of:
updating said charging list sub table job by job for the job process that said external server is requested to execute;
determining whether the job process that said external server is requested to execute is completed;
transmitting, when it is determined that the job process that said external server is requested to execute is completed, the updated charging list sub table from said external server to said image forming apparatus; and
combining said updated charging list sub table transmitted from said external server with said charging list table.

10. The charging method according to claim 6, further comprising the steps of:
updating said charging list sub table job by job for the job process that said external server is requested to execute;
determining whether a balance included in said updated charging list sub table has been spent while the job process that said external server is requested to execute is being executed;
transmitting, when it is determined that the balance in said updated charging list sub table has been spent, said updated charging list sub table from said external server to said image forming apparatus;
generating another charging list sub table associated with said external server within the range of the balance in said charging list table, based on said updated charging list sub table transmitted from said external server; and
transmitting said generated another charging list sub table from said image forming apparatus to said external server.

11. A non-transitory recording medium having a charging program recorded to be executed by a computer included in a charging system including (i) an image forming apparatus having a charging list table associated therewith that is necessary for a charging process and (ii) an external server connected with said image forming apparatus via a network for executing a job process in cooperation with said image forming apparatus, said charging program causing said computer to execute a process comprising the steps of:
receiving input of an instruction to execute a job process that the external server is to be requested to execute;
generating, when the input of the instruction to execute the job process is received, a charging list sub table associated with said external server within a range of a balance in said charging list table associated with the image forming apparatus;
updating said charging list table according to the generation of said charging list sub table;
transmitting, to said external server, said generated charging list sub table together with the job process that said external server is to be requested to execute; and
executing the job process that said external server is requested to execute, independently of said image forming apparatus, within a range of a balance included in said charging list sub table as received.

12. The recording medium according to claim 11, wherein said charging list table includes a fee for use, an advance payment and charging information according to a job process.

13. The recording medium according to claim 11, wherein said charging list sub table includes charging information according to a job process specific to said external server.

14. The recording medium according to claim 11, said charging program causing said computer to execute the process further comprising the steps of:
updating said charging list sub table job by job for the job process that said external server is requested to execute;
determining whether the job process that said external server is requested to execute is completed;
transmitting, when it is determined that the job process that said external server is requested to execute is completed, the updated charging list sub table from said external server to said image forming apparatus; and
combining said updated charging list sub table transmitted from said external server with said charging list table.

15. The recording medium according to claim 11, said charging program causing said computer to execute the process further comprising the steps of:
updating said charging list sub table job by job for the job process that said external server is requested to execute;
determining whether a balance included in said updated charging list sub table has been spent while the job process that said external server is requested to execute is being executed;
transmitting, when it is determined that the balance in said updated charging list sub table has been spent, said updated charging list sub table from said external server to said image forming apparatus;
generating another charging list sub table associated with said external server within the range of the balance in said charging list table, based on said updated charging list sub table transmitted from said external server; and
transmitting said generated another charging list sub table from said image forming apparatus to said external server.

16. An image forming apparatus having a charging list table associated therewith necessary for a charging process and connected via a network with an external server executing a job process in cooperation with said image forming apparatus, comprising:
a controller for executing a job process while executing a charging process job by job within a range of a balance included in said charging list table; and
a data transmission and reception device for transmitting and receiving data to and from said external server, wherein
said controller
(i) determines whether an instruction to execute a job process is given that requests said external server to execute said job, (ii) generates, when the instruction to execute is given, a charging list sub table associated with said external server within the range of the balance in said charging list table associated with the image forming apparatus, (iii) updates the balance in said charging list table according to the generation of said charging list sub table, (iv) transmits said generated charging list sub table together with the job process that said external server is to be requested to execute, to said external server via said data transmission and reception device, (v) receives, when said job process is completed by the external server, said charging list sub table updated job by job via said data transmission and reception device, and (vi) combines said updated charging list sub table received via said data transmission and reception device with said charging list table.

* * * * *